United States Patent
Wittrup et al.

(10) Patent No.: US 10,315,909 B2
(45) Date of Patent: *Jun. 11, 2019

(54) POUR SPOUT SIGNALING APPARATUS

(71) Applicant: CREATIVE BEVERAGE SOLUTIONS, LLC, Carrollton, TX (US)

(72) Inventors: Douglas Wittrup, Carrollton, CA (US); Bobby J. Davis, Howe, TX (US)

(73) Assignee: Creative Beverage Solutions, LLC, Carrollton, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/593,949

(22) Filed: May 12, 2017

(65) Prior Publication Data

US 2017/0247240 A1    Aug. 31, 2017

Related U.S. Application Data

(63) Continuation of application No. 14/659,056, filed on Mar. 16, 2015, now Pat. No. 9,718,665.

(60) Provisional application No. 61/955,713, filed on Mar. 19, 2014.

(51) Int. Cl.
*B67D 3/00* (2006.01)
*G01F 13/00* (2006.01)

(52) U.S. Cl.
CPC ......... *B67D 3/0041* (2013.01); *B67D 3/0051* (2013.01); *B67D 3/0077* (2013.01); *G01F 13/006* (2013.01); *G01F 13/008* (2013.01); *B67D 2210/00081* (2013.01)

(58) Field of Classification Search
CPC .. B67D 3/0077; B67D 3/0041; B67D 3/0051; B67D 2210/00081; B67D 3/0074; B67D 7/222; B67D 7/303; B67D 7/56; G01F 11/26; G01F 13/006; G01F 13/008; G01F 11/267; G01F 15/06
See application file for complete search history.

(56) References Cited

U.S. PATENT DOCUMENTS

| | | | | |
|---|---|---|---|---|
| 3,321,113 | A * | 5/1967 | Conry | G01F 11/265 222/477 |
| 4,265,370 | A * | 5/1981 | Reilly | G01F 11/00 222/211 |
| 4,436,223 | A * | 3/1984 | Wilson | B67D 3/0051 222/36 |

(Continued)

*Primary Examiner* — Patrick M. Buechner
(74) *Attorney, Agent, or Firm* — Eric W. Cernyar

(57) ABSTRACT

A signaling apparatus paces a free pour count and choreographs a movement to stop pouring. The apparatus emits a first signal after an approximately 200-ms time interval and a series of subsequent signals every approximately 400-ms thereafter. The first time interval approximates a first time, measured from a moment the sensor detects the start of the pour, needed to dispense a first unit of beverage through the pour spout, minus a second time needed to react to a signal and stop the pour. The 400-ms time interval approximates the time required to dispense each subsequent unit of beverage through the pour spout. In one embodiment, the signaling apparatus emits sequential pulses according to the pattern Y-Y-Y-Y-G-Y-Y-R, wherein Y is yellow, G is green, and R is red, wherein each pulse represents a quarter-ounce increment, the green pulse represents a standard pour, and the red pulse represents a full pour.

15 Claims, 5 Drawing Sheets

(56) References Cited

U.S. PATENT DOCUMENTS

| | | | | |
|---|---|---|---|---|
| 4,482,327 A * | 11/1984 | Brady | G09B 19/00 | 434/219 |
| 4,736,871 A * | 4/1988 | Luciani | B65D 51/248 | 222/25 |
| 5,044,521 A * | 9/1991 | Peckels | B67D 3/0051 | 215/329 |
| 5,255,819 A * | 10/1993 | Peckels | B67D 3/0041 | 222/1 |
| 5,505,349 A * | 4/1996 | Peckels | B67D 3/0041 | 222/36 |
| 6,306,290 B1 * | 10/2001 | Rolfes | B01D 35/143 | 210/138 |
| 6,409,046 B1 * | 6/2002 | Peckels | B67D 3/0041 | 222/1 |
| 6,662,976 B2 * | 12/2003 | Jensen | B67D 3/0003 | 222/442 |
| 8,453,878 B2 * | 6/2013 | Palmquist | B67D 1/1234 | 222/23 |
| 8,608,026 B1 * | 12/2013 | Temko | B67D 3/0051 | 222/1 |
| 9,718,665 B2 * | 8/2017 | Wittrup | B67D 3/0041 | |
| 2003/0055589 A1 * | 3/2003 | Mogadam | B67D 1/00 | 702/100 |
| 2005/0194402 A1 * | 9/2005 | Morrison | B65D 47/06 | 222/113 |
| 2007/0205203 A1 * | 9/2007 | Temko | A47G 23/16 | 220/712 |
| 2007/0214055 A1 * | 9/2007 | Temko | G06Q 20/203 | 705/22 |
| 2008/0195251 A1 * | 8/2008 | Milner | B67D 3/0035 | 700/237 |
| 2008/0235099 A1 * | 9/2008 | Armstrong | G06Q 30/02 | 705/15 |
| 2009/0277931 A1 * | 11/2009 | Zapp | B67D 3/0006 | 222/504 |
| 2010/0038378 A1 * | 2/2010 | Gabler | B67D 3/0006 | 222/23 |
| 2011/0024453 A1 * | 2/2011 | Fleisher | B65D 47/28 | 222/113 |
| 2011/0180563 A1 * | 7/2011 | Fitchett | B67D 3/0051 | 222/1 |
| 2012/0211516 A1 * | 8/2012 | Zapp | B65D 25/48 | 222/20 |
| 2013/0334246 A1 * | 12/2013 | Houck | B67D 3/0041 | 222/23 |
| 2014/0034686 A1 * | 2/2014 | Guerette | B67D 3/0003 | 222/504 |
| 2014/0242558 A1 * | 8/2014 | Daragjati | G09B 19/00 | 434/219 |
| 2014/0351068 A1 * | 11/2014 | Renfroe | G06Q 30/0641 | 705/15 |
| 2018/0201494 A1 * | 7/2018 | Chhabra | B67D 3/0041 | |

* cited by examiner

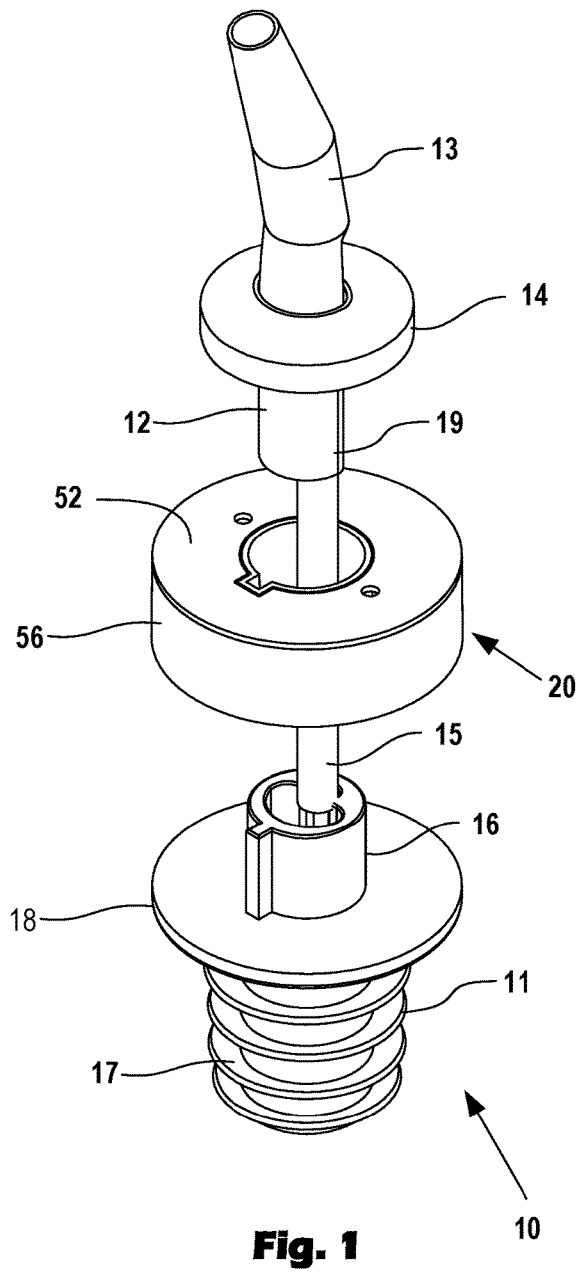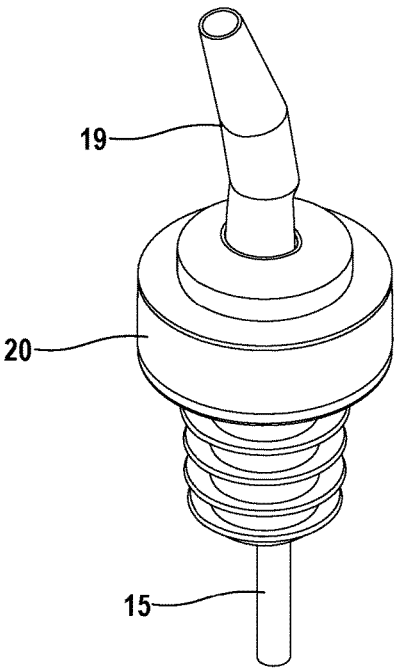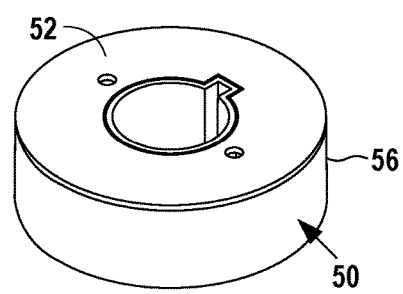

POUR SPOUT SIGNALING APPARATUS

RELATED APPLICATIONS

This application is a continuation of our U.S. patent application Ser. No. 14/659,056, filed Mar. 16, 2015, entitled "Pour Spout Signaling Apparatus," and claims the benefit of our U.S. Provisional Patent Application No. 61/955,713, filed Mar. 19, 2014 and entitled "Pour Spout," which are both herein incorporated by reference.

FIELD OF INVENTION

This invention relates generally to pour spouts, and more particularly, to pour spouts for beverage containers.

BACKGROUND

A "free pour" refers to the pouring of alcohol or mixing of drinks without using a measuring device. In the bartending art, bartenders are trained to count the amount of time they are pouring a beverage to roughly estimate the volume they are dispensing. Typically, the pouring is done through an industry-standard pour spout that is sized to dispense beverage under normal gravity pour conditions at a consistent flow rate. For example, a conventional pour spout will dispense about an ounce of beverage every one to two seconds under the pressure exerted by the weight of the beverage in a 750 ml or 1 liter beverage container.

In what is sometimes referred to in the trade as a "free pour count," the bartender begins the pour by inverting the beverage container to about a ten to twelve o-clock angle. Once the bartender observes the stream of beverage exiting the pour spout and/or hitting the glass, the bartender begins a paced count (e.g., "one, two, three, four . . . "). When the bartender reaches the desired count—e.g., "five" for a one-and-one-quarter-ounce "standard pour"—the bartender rapidly tilts the beverage container upward while simultaneously turning her wrist, in a graceful action referred to as a "cut." The speed at which a bartender paces her count depends on the count system employed. Some bartenders employ a "four count" system to dispense a quarter ounce of beverage per increment. Other bartenders employ a "three count" system in which an ounce is dispensed at count "three." Yet other bartenders employ a "one one-thousand, two one-thousand" count, incrementing the count about every second.

Several variables reduce the accuracy and consistency of a free pour. There is an initial reaction time between the moment a stream of beverage exits the pour spout and/or hits a glass and the moment the bartender begins the count. The flow rate may also be reduced by what is known in the bartending industry as a "hiccup," when an air bubble travels up the inverted spout. There is also a subsequent reaction time between the moment the bartender reaches the desired count and the moment the bartender begins the cut. Moreover, bartenders may not always count at an accurate and consistent pace. Of course, it is also easy for a bartender to get distracted and lose track of their count, particularly in busy environments. Frequently, these variables result in the bartender dispensing additional beverage—a phenomenon known as "overpouring"—costing the establishment lost revenues.

What is needed is a small, low-cost smart pour spout that will help bartenders keep track of how much beverage they are pouring and when they should begin a cut to stop the pour.

SUMMARY

A pour spout with a free pour signaling apparatus is provided to pace a free pour count. In one embodiment, the signaling apparatus comprises a sensor such as a level switch to detect the inversion of a beverage container, an electronic timing element that tracks a length of time of a pour, and a power source. The circuit is programmed to actuate at least one indicator coupled to the circuit to pace a free pour count and choreograph a movement to stop pouring.

The circuit is programmed with at least two time intervals selected to choreograph a free pour. An initial time interval—in one embodiment, about 200 ms—approximates a first length of time, measured from a moment the sensor senses the start of the pour, needed to dispense a first unit of beverage through the pour spout, minus a second length of time needed to react to a stop signal and to stop a free pour. A regular subsequent time interval—in one embodiment, about 400 ms—approximates an amount of time that it takes to dispense each subsequent unit of beverage through the pour spout. The circuit causes the indicator(s) to emit a first signal after the initial time interval has elapsed and regularly emit subsequent signals during each of a plurality of subsequent regular time intervals.

In another embodiment, the signaling apparatus comprises three light emitting diodes. The first LED (e.g., yellow) is used as a pacing light, with each pulse representing a quarter-ounce pour. A second LED (e.g., green) prompts the bartender when to begin to stop pouring in order to complete a standard pour of 1¼ or 1½ ounces of beverage. A third LED (e.g., red) prompts the bartender when to begin to stop pouring in order to complete a full pour of 2 or 3 ounces of beverage. Together, the LEDs emit sequential pulses of colored light according to the pattern Y-Y-Y-Y-G-Y-Y-R, wherein Y is yellow, G is green, and R is red.

In one embodiment, circuit is embodied in a housing that includes a column that fits over a neck of the pour spout. The housing includes a translucent exterior wall for diffusing light emanating from the indicator(s).

The following detailed description and the annexed sheets of drawings further illustrate the invention.

BRIEF DESCRIPTION OF THE DRAWINGS

FIG. 1 is a perspective view of one embodiment of an unassembled pour spout with a signaling apparatus according to the present invention.

FIG. 2 is a perspective view of one embodiment of an assembled pour spout with a signaling apparatus.

FIG. 4 is a perspective view of the signaling apparatus of FIG. 3, in assembled form.

DESCRIPTION OF THE INVENTION

Figure 3:
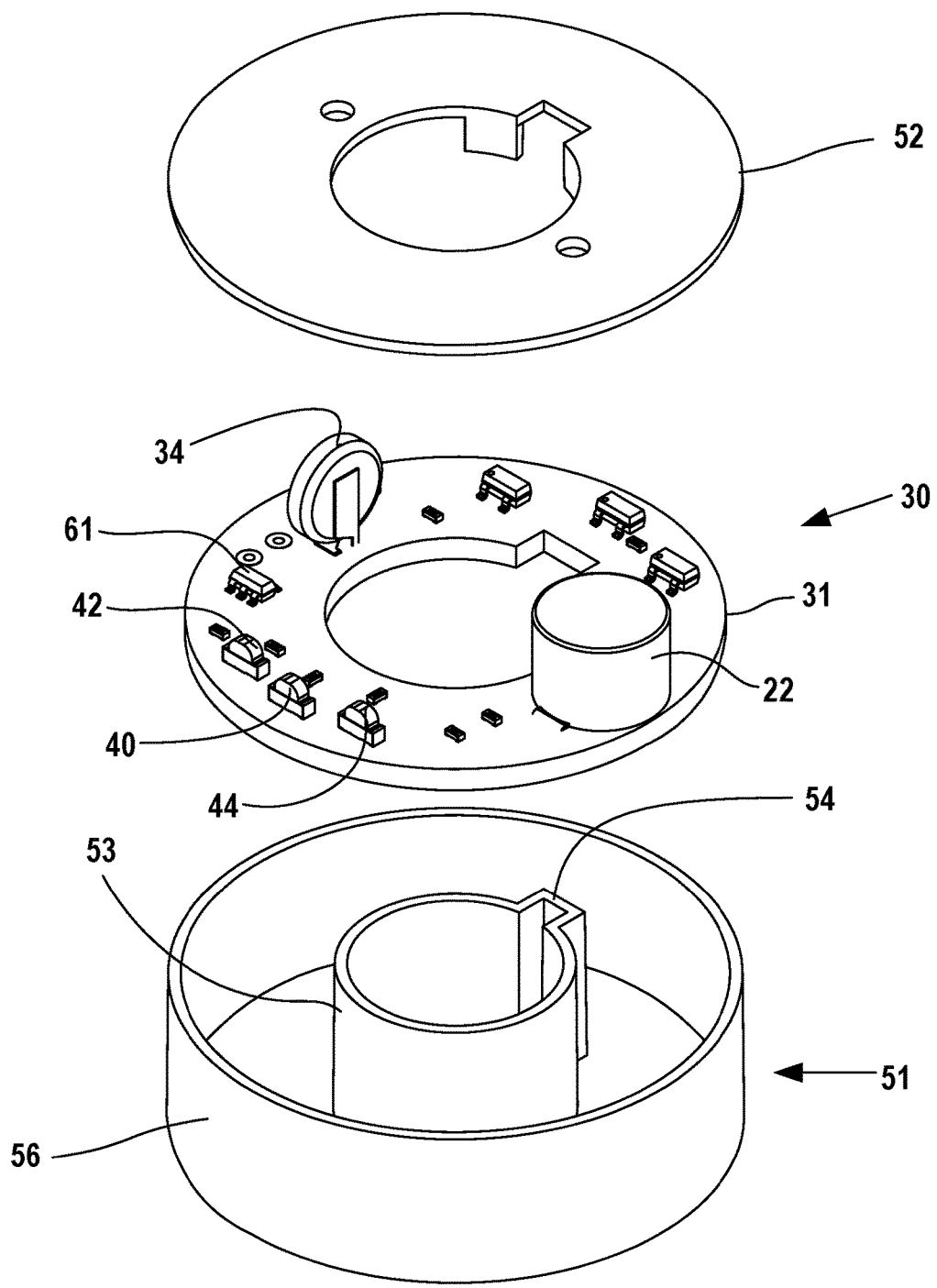
FIG. 3 is an exploded view of one embodiment of a signaling apparatus for a pour spout.
Figure 5:
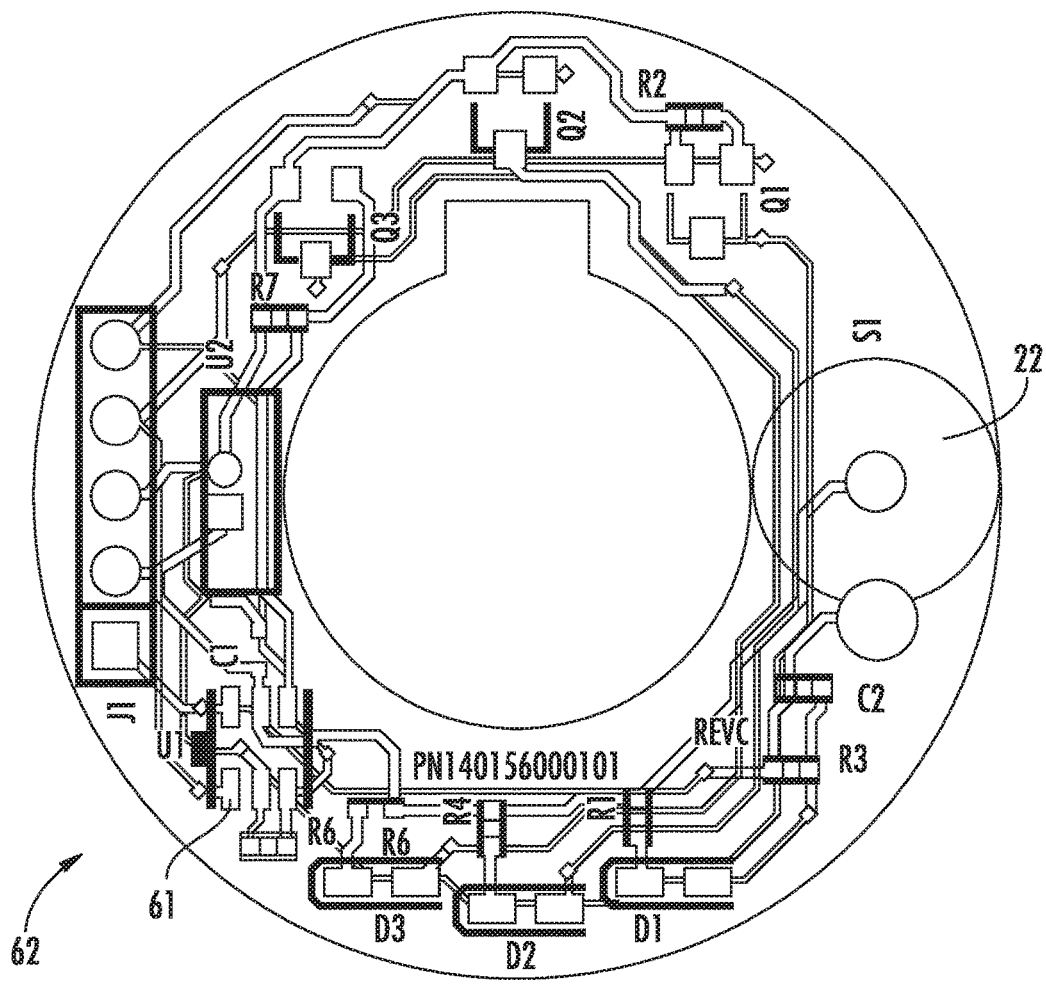
FIG. 5 is a silk screen of one embodiment of a printed circuit board for a signaling apparatus.

Before the subject invention is described further, it is to be understood that the invention is not limited to the particular embodiments of the invention described below or depicted in the drawings. Many modifications may be made to adapt or modify a depicted embodiment without departing from the objective, spirit and scope of the present invention. Therefore, it should be understood that, unless otherwise specified, this invention is not to be limited to the specific details shown and described herein, and all such modifications are intended to be within the scope of the claims made herein.

It is also to be understood that terms of art and words in general carry a range of meanings. Language is an imprecise medium of communication. The terminology and grammar employed in this specification is for the purpose of describing and explicating particular embodiments. Unless the context clearly demonstrates otherwise, the particular terms and grammatical structure employed should be liberally construed.

FIGS. 1-7 illustrate one embodiment of a pour-spout dispenser 10 and free pour signaling apparatus 20 that paces a free pour count. In resemblance to a standard "285" spout, the pour spout 10 comprises a spout assembly 19 and a rubber grommet 11. The spout assembly 19 comprises a channel 12 for channeling the beverage, a bent-nosed outlet tube 13 coupled to the channel 12, a cap member 14 for mounting the spout assembly 19 to the rubber grommet 11, and a breather tube 15 that allows air to flow into beverage container as beverage flows out of the spout 13.

The rubber grommet 11 comprises a neck portion 16, an inlet tube 17, and a flange 18. Like a standard "285" spout, the inlet tube 17 has radial fins to retain the dispenser 10 within, and form a liquid-tight seal with, the beverage container. The neck portion 16 is configured to fit around the channel 12 when the pour-spout dispenser 10 is assembled.

The signaling apparatus 20 comprises a sensor 22, a circuit 30, at least one indicator 40, 42, and/or 44—such as a light emitting diode LED, a tactile stimulator, or sound maker—coupled to the circuit 30, and a power source 34 that powers the circuit 30 and at least one indicator 40, 42, and/or 44.

The circuit 30 is programmed to provide signals through the indicators 40, 42 and/or 44 to pace a free pour count and choreograph the bartender's movement to stop pouring. A sensor 22—for example, a level switch, tilt sensor or micro tilt switch—senses if the pour spout 10 is tilted into a beverage-pouring orientation. An electronic timing element, for example, a microcontroller 61 or a counter coupled to a clock signal, tracks a length of time that the sensor 22 is tilted into a beverage-pouring orientation. When the beverage container is tipped to pour the beverage, the sensor 22 initiates a count sequence to activate the indicator(s) 40, 42 and/or 44 at appropriate times or increments. When the beverage container is in an upright position, the sensor 22 is in a position (open or closed) that deactivates the circuit 30.

In one embodiment, the indicator(s) 40, 42 and/or 44 comprise an amber LED 40, a green LED 42, and a red LED 44. The amber LED 40 is employed as a tempo light that pulses (i.e., flashes on and off) at regular time intervals to represent conventional increments (e.g., ¼ ounce) of a free pour count. The green LED 42 flashes on after an extended time interval to choreograph the bartender's completion of a "standard pour" (e.g., 1¼ ounces) or longer pour (e.g., 1½ ounces). Finally, the red LED 44 flashes on after a maximum time interval to choreograph the bartender's completion of a two-ounce pour (e.g., 2 ounces or 3 ounces). In a more particular example, the LEDs 40, 42, 44 are programmed to emit sequential pulses of colored light according to the pattern Y-Y-Y-Y-G-Y-Y-R, wherein Y is yellow, G is green, and R is red, and wherein each letter in the pattern corresponds to ¼-ounce increments.

The circuit 30 is programmed with at least two time intervals. A first time interval is selected to approximate an amount of time, from a moment the sensor 22 is activated, required to dispense a first unit of beverage from the pour spout 10, minus an estimated typical amount of time that elapses between a moment the first signal is provided to a bartender and a moment the bartender cuts the flow of beverage off. A second time interval is selected to approximate an amount of time required to dispense each subsequent unit of beverage from the pour spout 10.

In tests conducted in connection with the present invention, about 600 ms typically elapses between the moment a sensor signals the inversion of the beverage container and the moment the first quarter ounce of beverage is dispensed from the pour spout 10. About 400 ms elapses for each subsequent quarter ounce dispensed from the pour spout 10. The longer time needed to dispense the first quarter ounce is due in part to a bubble of air—known in the bartending art as a "hiccup"—that travels up the pour spout 10 at the beginning of the pour.

Also, about 400 ms of time typically elapses between the moment a signal is emitted to stop pouring and the moment the pouring actually stops. Human reaction time—i.e., the time between the moment the signal is emitted and the initial motor response to begin the cut—accounts for one component of the 400 ms of delay. Time needed to perform the cut—i.e., the progression of arm and wrist movements that un-invert the beverage container—accounts for another component of the 400 ms of delay.

Accordingly, in one embodiment, the first time interval is selected to equal about 600 ms−400 ms=200 ms, and the second time interval is selected to equal about 400 ms. Thus, the first free pour count pacing signal is emitted at about 200 ms (i.e., the first time interval) after the sensor 22 detects a condition, such as the inversion of the beverage container, consistent with the start of a pour, and subsequent free pour count pacing signals are emitted once approximately every 400 ms (i.e., the second time interval) thereafter. Because each of the signals is emitted early enough to compensate for human delay, the signaling apparatus 20 helps a bartender complete a pour without overpouring the beverage.

Figure 6:
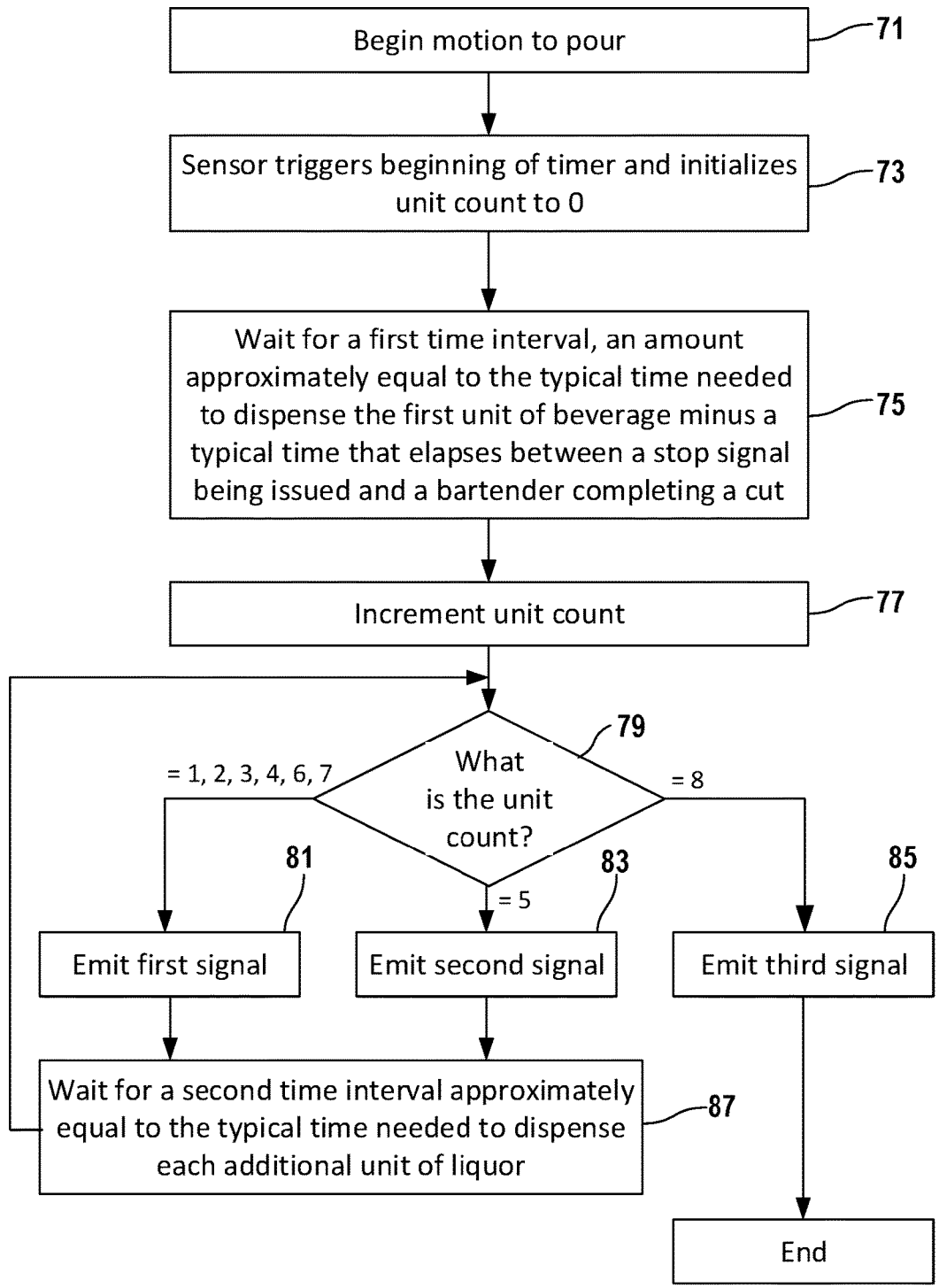
FIG. 6 is a functional flow chart of one embodiment of a signaling apparatus for a pour spout.
Figure 7:
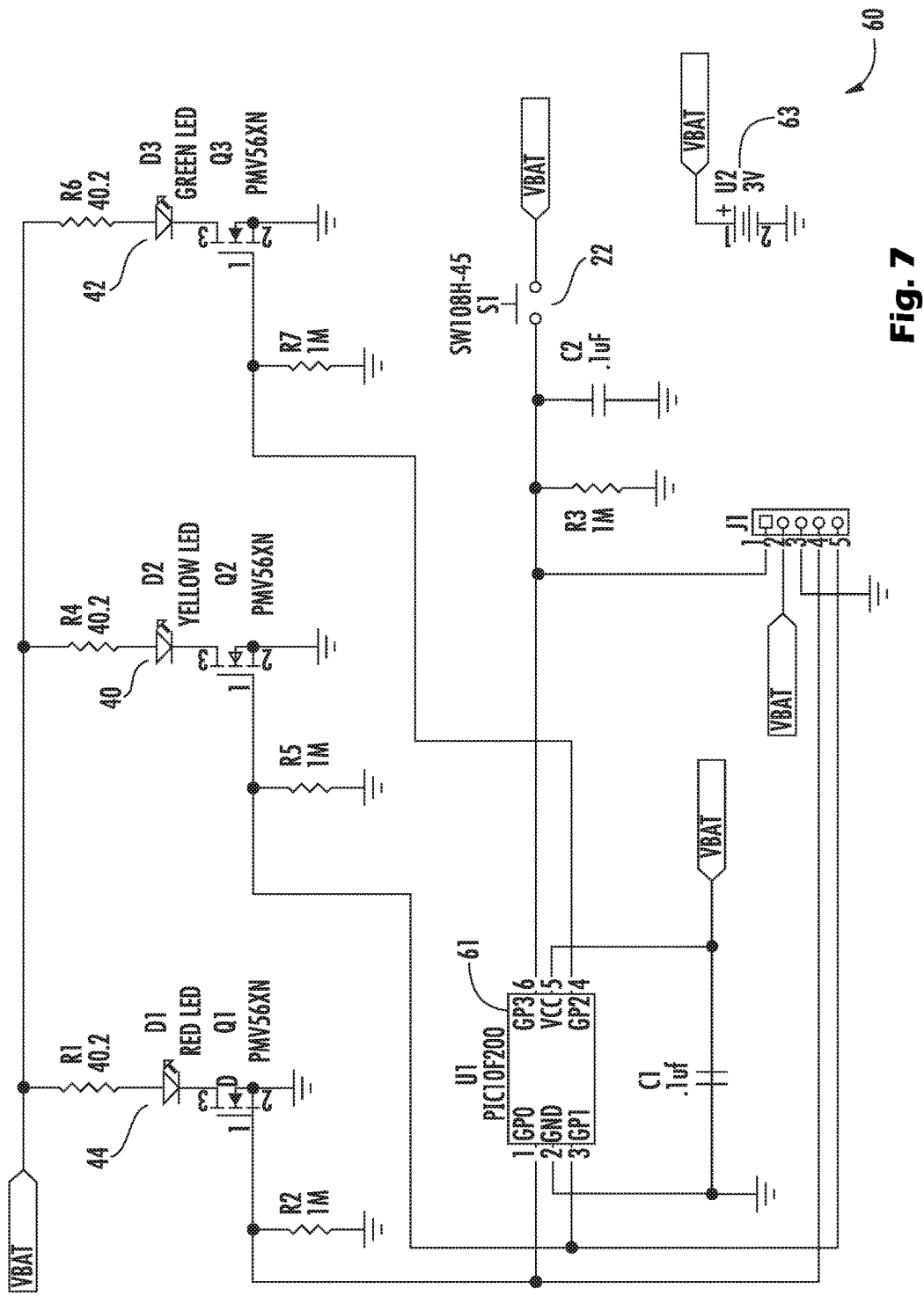
FIG. 7 is a circuit diagram of one embodiment of a signaling apparatus for a pour spout.

The circuit 30 is embodied on a ring-shaped printed circuit board assembly (PCBA) 31. FIG. 6 is a silkscreen 62 of one embodiment of the PCBA. FIG. 7 is a circuit board diagram for the circuit 30. The circuit 30 employs a PIC10F200 microcontroller 61 and is powered by one or more batteries 34 mounted in a battery bracket on the PCBA 31. In one embodiment, the circuit 30 also includes logic to keep the circuit 30 activated for a minimum period of time after activation to correct for tilt switch chatter.

A cylindrical housing 50 encloses the circuit PCBA 31. In one embodiment, the housing 50 comprises a base 51 and a cap 52. A substantially cylindrical interior column 53 rising up from the base 51 provides a seat for the PCBA 31. The interior column 53 also serves as a sleeve that fits over and compresses the neck 16 of the rubber grommet 11 to securely hold the channel 12 within the neck 16 of the rubber grommet 11. A keyed portion 54 of the interior column 53 receives a projecting portion 19 on the neck 16 of the rubber grommet 11, preventing the housing 50 from rotating with respect to the robber grommet 11.

A substantially cylindrical translucent outer wall 56 also rises up from the perimeter of the base 51. The translucence of the outer wall 54 diffuses light emanating from the indicator(s) 40, 42, and/or 44, so that the indicator(s) 40, 42, and/or 44 light up substantially all of the wall 56.

FIG. 3 is a functional flow chart illustrating the programming of the signaling apparatus 20. In block 71, a bartender begins the progression of movements to invert the beverage container to pour. In block 73, the sensor 22 senses some part of this progression, for example, when the beverage container is tilted at least 90 degrees. This triggers a timer and initializes a unit count to zero. In block 75, the circuit 30 waits for a first time interval—for example, about 200 ms—approximately equal to the typical time needed to dispense a first unit of beverage, accounting for any "hiccup," minus a typical time that elapses between a stop signal being issued and the bartender completing a cut. In block 77, the circuit 30 increments a unit count. Next, depending on the unit count, the circuit 30 causes one of a first, second, and third indicators 40, 42, and 44 to emit a signal. If the unit count is other than five or eight, then in block 81 the first indicator 40 emits a signal pulse. If the unit count is five, then in block 83 the second indicator 42 emits a signal pulse. If the unit count is eight, then in block 85 the third indicator 44 emits a signal pulse. For unit counts less than eight, flow proceeds from block 81 or block 83 to block 85, at which point the circuit 30 waits for a second time interval approximately equal to the typical time needed to dispense each additional unit of liquor. After eight signals are emitted, the indicators 40, 42, and 44 all go and stay dark until the next pour.

The present invention may be adapted to into many different embodiments in which the signaling apparatus may take a different form, employ a different count, use one or more different signals, use different timing intervals, and/or signal different pour increments. For example, in one alternative embodiment, the signaling apparatus 20 comprises three indicators 40, 42, 44—such as green, yellow, and red LEDs—representing go, slow, and stop. In this embodiment, the green light indicates that the bartender should pour or continue pouring. The yellow light warns the bartender that they should prepare to stop pouring. The red light notifies the bartender that they have dispensed the full amount and should stop. In another embodiment, the signaling apparatus 20 can be slid onto an existing standard "285" spout.

Although the foregoing specific details describe various embodiments of the invention, persons reasonably skilled in the art will recognize that various changes may be made in the details of the apparatus of this invention without departing from the spirit and scope of the invention as defined in the appended claims.

We claim:

1. A free pour signaling apparatus for a pour spout that paces a free pour count, the free pour signaling apparatus comprising:
   a sensor that senses a condition consistent with a start of a pour;
   a circuit including an electronic timing element that tracks a length of time of a pour;
   at least one indicator coupled to the circuit;
   the circuit actuating the at least one indicator to pace a free pour count and choreograph a movement to stop pouring; and
   a power source that powers the circuit and at least one indicator;
   wherein:
      the at least one indicator signals emits at least first and second signals to choreograph a free pour;
      the first signal is emitted when an initial time interval elapses, wherein the initial time interval is approximately an empirically-derived average first length of time, beginning at a moment the sensor senses the start of the pour, and ending when a first unit of beverage is humanly poured through the pour spout, minus an empirically-derived average second length of time needed to humanly react to a stop signal and to stop a free pour; and
      the second signal is emitted at each of a plurality of subsequent regular time intervals following the initial time interval, wherein the initial time interval approximates an empirically-derived amount of time that it takes to humanly dispense each subsequent unit of beverage through the pour spout.

2. The free pour signaling apparatus of claim 1, wherein the circuit is configured to actuate a second indicator to choreograph the bartender's completion of a standard pour.

3. The free pour signaling apparatus of claim 2, wherein the standard pour is 1¼ or 1½ ounces of beverage.

4. The free pour signaling apparatus of claim 1, wherein the pour spout comprises a rubber grommet having a neck portion, a finned portion, and a flanged portion, the finned portion being configured to be inserted into a beverage container and form a tight seal with the beverage container, and the neck portion being configured to fit around a conduit coupled to the rubber grommet, the pour spout further comprising a bent-nosed spout coupled to the conduit, a cap member for mounting the conduit in the rubber grommet, and a breather tube that allows air to flow into beverage container as beverage flows out of the spout.

5. The free pour signaling apparatus of claim 1, wherein the circuit is embodied in a housing that includes a column that fits over a neck of the pour spout.

6. The free pour signaling apparatus of claim 1, wherein the circuit is embodied in a housing mounted on the pour spout, the housing including a translucent exterior wall for diffusing light emanating from the at least one indicator.

7. The free pour signaling apparatus of claim 1, wherein the sensor is a level switch.

8. The free pour signaling apparatus of claim 1, wherein the at least one indicator comprises one or more light emitting diodes.

9. The free pour signaling apparatus of claim 1, wherein the first time interval is about 200 ms and the second time interval is about 400 ms.

10. A pour spout with a free pour signaling apparatus that paces a free pour count, the free pour signaling apparatus comprising:
   a sensor that senses a condition consistent with a start of a pour;
   a circuit including an electronic timing element that tracks a length of time of a pour;
   a first indicator coupled to the circuit;
   the circuit actuating the first indicator to pace a free pour count and choreograph a movement to stop pouring; and
   a power source that powers the circuit and the first indicator;
   wherein:
      the at least one indicator emits at least first and second signals to choreograph a free pour;
      the first signal is emitted when an initial time interval elapses, wherein the initial time interval is approximately an empirically-derived average first length of time, beginning at a moment the sensor senses the start of the pour, and ending when a first unit of beverage is humanly poured through the pour spout, minus an empirically-derived average second length of time needed to humanly react to a stop signal and to stop a free pour; and the second signal is emitted at each of a plurality of subsequent regular time intervals following the initial time interval, wherein the initial time interval approximates an empirically-derived amount of time that it takes to humanly dispense each subsequent unit of beverage through the pour spout.

11. The pour spout of claim 10, wherein the circuit is embodied in a housing that includes a column that fits over a rubber neck of the pour spout.

12. The pour spout of claim 10, wherein the circuit is embodied in a housing mounted on the pour spout, the housing including a translucent exterior wall for diffusing light emanating from the at least one indicator.

13. The pour spout of claim 10, wherein the sensor is a level switch.

14. The pour spout of claim 10, wherein the first length of time is about 600 ms and the second length of time is about 400 ms.

15. A pour spout with a free pour signaling apparatus that paces a free pour count, the free pour signaling apparatus comprising:

a sensor that senses a condition consistent with a start of a pour;

a circuit including an electronic timing element that tracks a length of time of a pour;

first and second lights coupled to the circuit;

the circuit flashing the first light at regular intervals to pace a free pour count;

the circuit flashing the second light to choreograph a movement to complete a standard pour; and a power source that powers the circuit and first and second lights;

wherein each of the first and second lights are timed to flash a predetermined amount of time before the signaled pour amount is dispensed, wherein the predetermined amount of time is approximately an empirically-derived length of time humanly needed to react to a stop signal and to stop a free pour.

* * * * *